March 8, 1932.  J. W. TATTER  1,848,678
BRAKE MECHANISM
Filed Feb. 27, 1928   3 Sheets-Sheet 1

Witness:
William G. Kilroy

Inventor.
John W. Tatter
Hill & Hill
Attys

March 8, 1932. J. W. TATTER 1,848,678
BRAKE MECHANISM
Filed Feb. 27, 1928 3 Sheets-Sheet 2

Witness:
William P. Kilroy

Inventor:
John W. Tatter

March 8, 1932.   J. W. TATTER   1,848,678
BRAKE MECHANISM
Filed Feb. 27, 1928   3 Sheets-Sheet 3

Patented Mar. 8, 1932

1,848,678

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE MECHANISM

Application filed February 27, 1928. Serial No. 257,396.

My invention relates to brake mechanism and has among its other objects the provision of brake mechanism which is compact, durable, efficient and satisfactory for use wherever found applicable.

A particular object of the invention is to provide improved brake mechanism which is self-adjusting to take up slack or wear in the mechanism.

Another particular object of the invention is to provide improved brake mechanism including a plurality of brakes and means for equalizing the braking effort of the brakes.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 5 is an enlarged section taken on line 5—5 of Fig. 1;

Fig. 6 is an enlarged section taken on line 6—6 of Fig. 5;

Fig. 7 is an enlarged section taken on line 7—7 of Fig. 5;

Fig. 8 is an enlarged section taken on line 8—8 of Fig. 5; and

Fig. 9 is an enlarged section taken on line 9—9 of Fig. 2.

Figure 1:
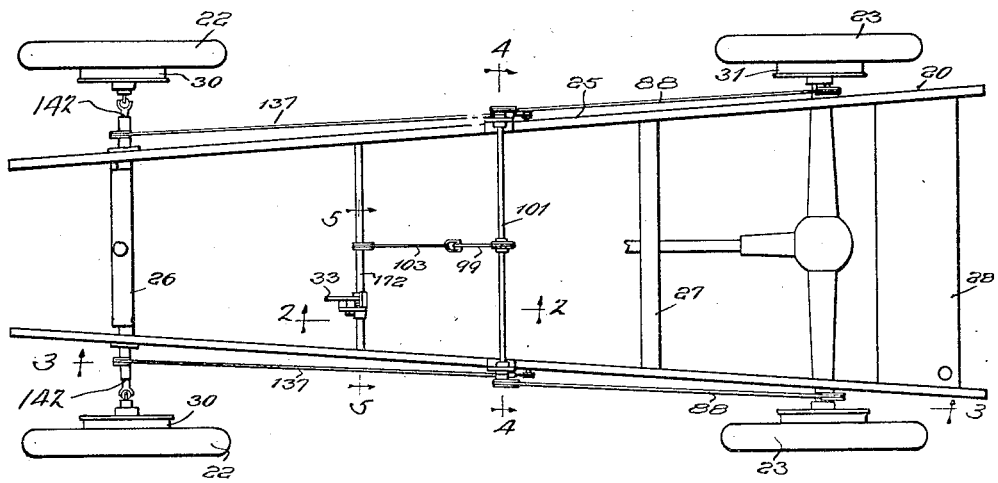
Fig. 1 is a plan view of the chassis of an automobile which is provided with brake mechanism that embodies the invention.

Referring for the present to Fig. 1, the reference character 20 designates generally the chassis of an automobile, provided with front and rear wheels 22 and 23, respectively. In this instance, the chassis 20 comprises longitudinal side members 25 and transverse members 26, 27 and 28. Associated with each of the wheels 22 and 23 is a brake, the brakes associated with the front wheels 22 being identified by the reference characters 30 and the brakes associated with the rear wheels 23 being identified by the reference characters 31. At 33, I have shown a brake or foot pedal whereby the operator of the vehicle operates the brakes 30 and 31 simultaneously, the foot pedal 33 being operatively connected to the brakes 30 and 31 by means hereinafter described.

Figure 4:
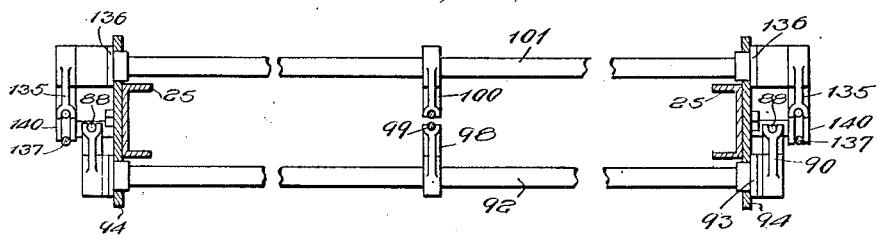
Fig. 4 is an enlarged section taken on line 4—4 of Fig. 1.

The rear brakes 31 may be of the ordinary type including brake drums and brake bands (not shown), the latter being adapted to be operatively related to shaft sections 82 for moving the bands into engagement with the brake drums in the usual manner. Pinned to the shaft 82 is a segment 86 having a peripheral groove 87 which accommodates a cable 88. The cable 88 has one of its ends secured to the segment 86 and has the other of its ends secured to a segment 90 fixed to a shaft 92 which is rotatably journaled in bearing blocks 93, the bearing blocks 93 being slidably journaled in brackets 94 which are rigidly secured to the longitudinal frame members 25. Of course, there are two cables 88, one being provided for each of the rear brakes 31. Referring to Fig. 4, it will be noted that the segments 90 are secured to the ends of the shaft 92 and referring to Fig. 2, it will be noted that a segment 98 is secured to the shaft 92 substantially midway between its ends. A cable 99 has one of its ends secured to the segment 98 and has the other of its ends secured to a segment 100 which is secured to a shaft 101 substantially midway between the ends of this shaft. The cable 99 is trained over a sheave 102 which is attached to one end of a cable 103, the other end of the cable being attached to a segment 104.

It is readily understood that if the segment 104 is displaced in a counter-clockwise direction (Fig. 2) it will pull upon the cables 103 and 99 and cause angular displacement of the shafts 92 and 101. The shaft 92 will be displaced in a counter-clockwise direction and this movement of the shaft will be transmitted to the shaft sections 82 of the rear brakes 31 through the cables 88. Rotation of the shaft sections 82 will cause the brake bands of the brakes 31 to be moved into engagement with their respective brake drums.

Figure 3:
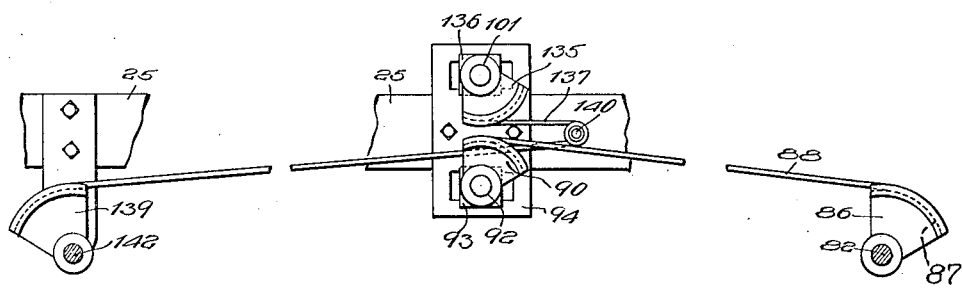
Fig. 3 is an enlarged section taken on line 3—3 of Fig. 1.

Referring now to Figs. 1 and 3, the segments 135 are secured to the ends of the shaft 101 and the shaft is rotatably journaled in bearing blocks 136 which are slidably mounted in the brackets 94. Secured to each of the segments 135 is one end of a cable 137 which has its other end secured to a segment 139, there being a segment 139 associated with each of the front brakes 30. It will be noted that each cable 137 is trained over a sheave 140 mounted upon one of the longitudinal frame members 25. Each segment 139 is pinned or otherwise secured to a shaft section 142 which is rotatably and operatively related to the brake bands (not shown) of the brakes 30 for moving the bands into engagement with their respective brake drums in the usual manner and as described with reference to the rear brakes 31.

Obviously, the front brakes function in substantially the same manner as the rear brakes. However, the mechanism whereby the shaft sections 142 are operatively connected to the brake pedal 33 differs in construction from the mechanism which connects the shaft section 82 of the rear brakes to the brake pedal. But it will be noted that if the brake pedal is depressed in such manner that the segment 104 is angularly displaced in a counter clockwise direction (Fig. 2), the segment 100 and the shaft 101 will be angularly displaced in a clockwise direction (Fig. 2) so that the cables 137 will angularly displace the segment 139 and the shaft sections 142 in a clockwise direction (Fig. 3) to actuate the braking mechanism associated with the front wheels 22.

The brake lever 33 is operatively connected to the segment 104 by mechanism resembling mechanism shown and described in my copending application, Serial No. 203,588, filed July 5, 1927. The lever 33 is preferably slidably and rotatably journaled upon a boss 170 which is preferably formed integral with a collar 171 keyed to a shaft 172, the shaft 172 being rotatably journaled in a bracket 174 fixed to one of the longitudinal frame members 25 and in a bracket 175 fixed to the other of the longitudinal members 25 (Fig. 5). The lever 33 is preferably provided with ratchet teeth 177 engageable with ratchet teeth 178 provided upon a collar 180, the collar 180 being provided with ratchet teeth 181 engageable with ratchet teeth 182 provided upon a lever 183 which is journaled upon the shaft 172. The collar 180 is keyed to the shaft 172.

The lever 33 is yieldingly urged toward the collar 180 by a plurality of compression springs 185 disposed in drilled holes 186 provided in the collar 171. The outer end of each spring 186 bears against a cup-shaped member 187 slidably journaled in the same hole 186 and arranged to bear against the lever 33. The lever 183 is yieldingly urged toward the collar 180 by a plurality of compression springs 190 disposed in holes 191 formed in a collar 192 which is preferably formed integral with the bracket 175. The outer end of each spring 190 bears against a cup-shaped member 193 which is slidably journaled in the same hole 191 and bears against the lever 183. Obviously, the springs 185 yieldingly hold the ratchet teeth 181 in engagement with the ratchet teeth 178 and the springs 190 yieldingly hold the ratchet teeth 182 in engagement with the ratchet teeth 181.

Figure 2:
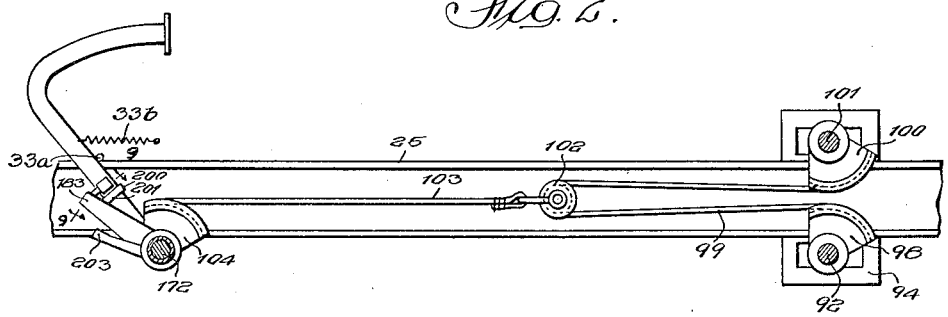
Fig. 2 is an enlarged section taken on line 2—2 of Fig. 1.

As best illustrated in Figs. 2 and 9, the lever 33 is preferably provided with an integral boss 195 having a recess 196 in which a compression spring 197 is disposed. The outer end of the spring 197 bears against a cup-shaped member 198 slidably journaled in the recess 196 and the cup-shaped member 198 bears against the lever 183 in such manner that it yieldingly urges the lever 183 in a counter clockwise direction (Fig. 2). However, relative angular displacement between the levers 33 and 183 is limited by a stop 200 carried at one end of a bar 201 which is formed integral with or secured to the lever 183. Angular displacement of the lever 183 in a counter clockwise direction (Fig. 2) is limited by a stop 203 preferably formed integral with the collar 192.

It is readily understood that when the foot pedal 33 is depressed, the lever 183 will move in unison with the foot pedal 33 until it engages the stop 203 whereupon the spring 197 will yield so that the lever 102 can continue to rotate in a counter clockwise direction (Fig. 2). Angular displacement of the foot pedal 33 in a counter clockwise direction (Fig. 2) will cause the shaft 172 to rotate through the same distance, the motion of the foot pedal 33 being transmitted to the shaft 172 through the ratchet teeth 177 and 178 and the collar 180. Rotation of the shaft 172 in a counter clockwise direction (Fig. 2) will be transmitted to the shafts 92 and 101 through the cables 103 and 99 so that the shaft 92 will be angularly displaced in a counter clockwise direction (Fig. 2) and the shaft 101 will be angularly displaced in a clockwise direction (Fig. 2). The angular displacement of the shaft 101 is transmitted to the segments 139 through the cables 137 and the angular displacement of the shaft 92 is transmitted to the segments 86 through the cables 99. Of course, when the segments 86 and 139 are displaced in this manner, the brakes function in the manner described above. When the foot pedal 33 is permitted to return to the position wherein it is shown in Fig. 2, the brake bands 42 and 42a in the rear and front brakes 31 and 30, respectively, contract and their linings are disengaged from the respective brake drums.

When the apparatus functions in this manner and there is not an undesirable slack in the cables and in the brake bands, the angular movement of the foot pedal 33 during the time it is being depressed is transmitted to the shaft 172 through the ratchet teeth 177 and 178 and the collar 180 as set forth above and the spring 197 is compressed to a less degree than is necessary to have the teeth 181 upon the collar 180 slip over a distance of one tooth upon the ratchet teeth 182 of the lever 183. Of course, when the foot pedal 33 approaches the lever 183 and the spring 197 is compressed, the teeth 181 ride up upon the teeth 182 and the lever 183 is moved away from the collar 180 against the action of the springs 190.

If there is too much slack in the brake bands or in the cables and other parts which connect the foot pedal to the brake bands, the foot pedal 33 will have to be displaced through a relatively large angle before the brake bands will bring the brake linings into effective engagement with the brake drums. In this event, the angular displacement of the foot pedal 33 after the lever 183 has engaged the stop 203 will cause the ratchet teeth 181 to advance through an angle greater than the angular distance between adjacent teeth of the ratchet teeth 182 and when the foot pedal 33 is released and returns to the position wherein it is shown in Fig. 2, the springs 197 will elongate until the stop 200 engages the foot pedal 33. This movement of the lever 183 relative to the foot pedal 33 is accompanied by displacement of the teeth 178 a distance equal to one tooth upon the teeth 177 so that the shaft 172 is displaced through an equal angle. This, of course, will take up any slack in the cables or other parts which operatively connect the foot pedal to the brake bands so that the next time the foot pedal is depressed in a counter clockwise direction (Fig. 2) the brake linings will effectively engage the brake drums before the foot pedal 33 can be displaced through an angle which is sufficiently large to cause the teeth 181 to advance upon the teeth 182. However, if at some later time, there is too much slack between the connections between the foot pedal and the brake bands, the teeth 181 will advance upon the teeth 182 to cause the teeth 178 to again advance upon the teeth 177 so that the slack will be taken up.

The arrangement of cables 103 and 99 together with the sheave 102 provides an equalizer so that the effort applied to the brake pedal is distributed equally between the front and rear brakes. Of course, it is assumed that the radii of the segments 98 and 100 are equal. If it is desired to apply most of this effort to either the front brakes or the rear brakes, the segments 98 and 100 can be modified accordingly.

The bearing blocks 93 and 136 slide freely in the brackets 94 and it is readily understood that the shafts 92 and 101 will equalize the forces exerted upon the rear brakes and equalize the forces exerted upon the front brakes, the arrangement being such that while the shafts 92 and 101 normally lie at right angles to the longitudinal axis of the chassis, either end of each of these shafts may advance toward the front of the chassis or be displaced toward the rear thereof.

A stop 33a is preferably provided for the brake pedal 33 and a spring 33b is preferably employed to yieldingly hold it against the stop.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a vehicle having a plurality of brakes associated therewith, a plurality of rotatable laterally movable shafts, a plurality of segments secured to said shafts, a cable operatively related to certain of the segments secured to the respective shafts, a brake pedal operatively related to said cable in a manner to divide the braking effort between said shafts, and cables operatively connected to other of said segments and to said brakes.

2. In a vehicle having a plurality of brakes associated therewith, a rock shaft, a plurality of rotatable shafts, a plurality of segments secured to said rotatable shafts, a cable operatively related to certain of the segments secured to the respective shafts, means operatively connected to other of said segments and to said brakes, a brake pedal mounted on and rotatable with respect to said rock shaft, means mounted on said rock shaft and operatively related to said pedal for adjusting the pedal with respect to the rock shaft, and means operatively related to said adjusting means and to said cable in a manner to divide the braking effort between said rotatable shafts.

3. In a vehicle having front and rear wheels, a brake associated with each of said wheels, a pair of rotatable laterally movable shafts, a brake pedal, means for connecting said pedal and shafts, said means including a sheave and cable operatively related to said pedal and shafts, respectively, in a manner to divide the braking effort between said shafts, means for operatively connecting the brakes associated with said rear wheels to one of said shafts, and means for connecting the brakes associated with said front wheels to the other of said shafts.

4. In a vehicle having front and rear wheels, a brake associated with each of said wheels, a pair of rotatable laterally movable, vertically spaced shafts, a plurality of segments secured to each of said shafts, a cable operatively related to certain of the segments secured to the respective shafts, a brake pedal, means adjustably connected to said pedal and operatively related to said cable in a manner to divide the braking effort between said shafts, means for connecting the brakes associated with said rear wheels to certain other of the segments secured to one of said shafts, and means for connecting the brakes associated with said front wheels to certain other of the segments secured to the other of said shafts.

In testimony whereof, I have hereunto signed my name.

JOHN W. TATTER.